(12) United States Patent
Miyagawa et al.

(10) Patent No.: US 8,528,985 B2
(45) Date of Patent: Sep. 10, 2013

(54) WEBBING GUIDE STRUCTURE

(75) Inventors: Toshihito Miyagawa, Aichi-ken (JP);
Teruhiko Koide, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 33 days.

(21) Appl. No.: 13/340,729

(22) Filed: Dec. 30, 2011

(65) Prior Publication Data
US 2012/0175936 A1 Jul. 12, 2012

(30) Foreign Application Priority Data
Jan. 7, 2011 (JP) ................................. 2011-002194

(51) Int. Cl.
*A62B 35/00* (2006.01)

(52) U.S. Cl.
USPC .......................................... 297/474; 297/468

(58) Field of Classification Search
USPC .................... 297/468, 474, 475, 481
See application file for complete search history.

(56) References Cited

U.S. PATENT DOCUMENTS

| | | | | |
|---|---|---|---|---|
| 4,681,345 | A | * | 7/1987 | Swartout .................... 280/801.1 |
| 4,730,875 | A | * | 3/1988 | Yoshitsugu ................... 297/468 |
| 6,267,409 | B1 | * | 7/2001 | Townsend et al. ......... 280/801.1 |
| 6,666,519 | B2 | * | 12/2003 | Palliser et al. ................ 297/483 |

FOREIGN PATENT DOCUMENTS
JP 2004-299657 10/2004

* cited by examiner

*Primary Examiner* — Sarah B McPartlin
(74) *Attorney, Agent, or Firm* — Roberts Mlotkowski Safran & Cole, P.C.

(57) ABSTRACT

In a webbing guide structure, when a take-up stopper has made abutted to a contact face of a webbing guide due to take-up force acting on a webbing arising from a spiral spring of a webbing take-up device, a rigid portion of the webbing extends out from the webbing guide towards the vehicle front-side, and a portion of the rigid portion further towards an tip end than the take-up stopper projects out from the rear seat back to the vehicle front-side. Due to utilizing biasing force of the spiral spring to project the rigid portion out from the rear seat back to the vehicle front-side, the need to provide a separate mechanism to project the rigid portion out can accordingly be eliminated. A gap between the rear seat back and the webbing can thereby be provided by employing a simple structure.

3 Claims, 13 Drawing Sheets

FIG.10A
FIG.10B
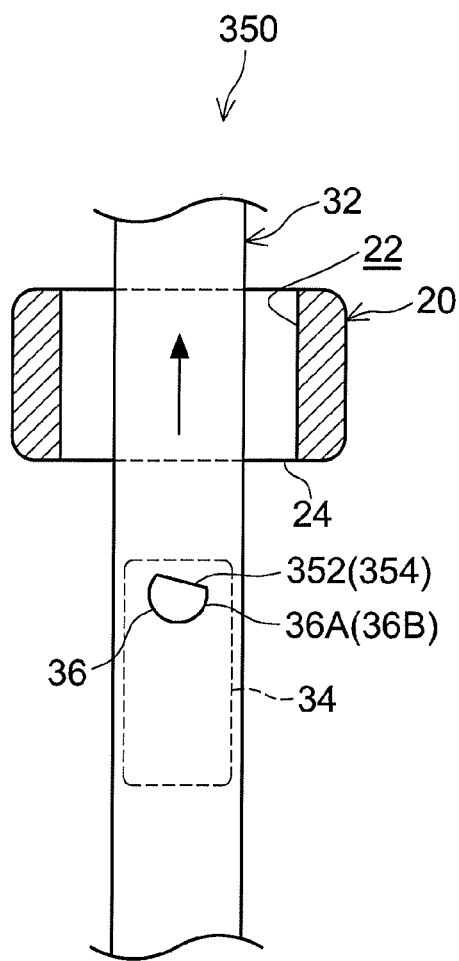
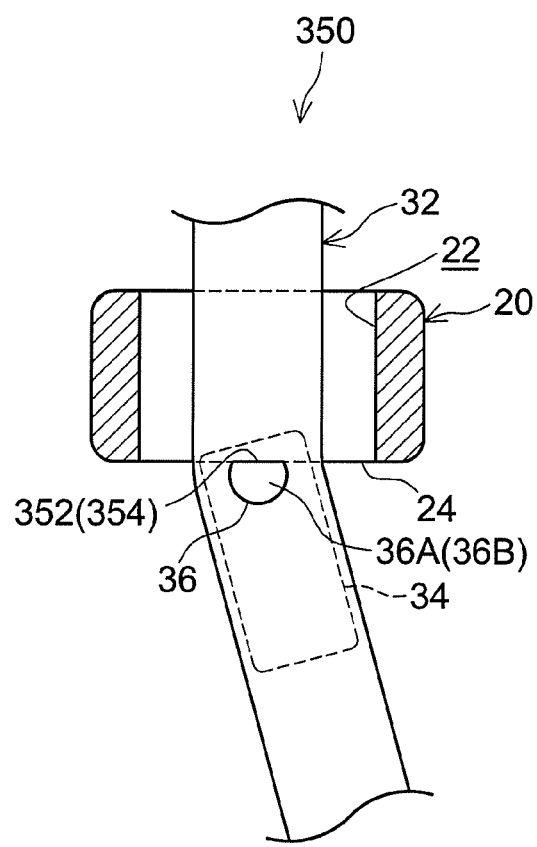

WEBBING GUIDE STRUCTURE

CROSS-REFERENCE TO RELATED APPLICATION

This application claims priority under 35 USC 119 from Japanese Patent Application No. 2011-002194 filled Jan. 7, 2011, the disclosure of which is incorporated by reference herein.

BACKGROUND OF THE INVENTION

1. Field of the Invention

The present invention relates to a webbing guide structure for webbing that fits around a vehicle occupant.

2. Related Art

A vehicle seat described in Japanese Patent Application Laid-Open (JP-A) No. 2004-299657 is equipped with a seat back and a seat cushion. A retractor is installed inside the seat back, and an outer belt extending out from the retractor is capable of being pulled out from an extraction opening in the seat back.

A movable member is disposed inside the seat back below the extraction opening. The movable member is provided with an air bag, and the air bag is connected to an air pump. A drive motor is attached to the air pump and the drive motor is connected to a controller. A pressure sensor is installed inside the seat cushion, and the pressure sensor is also connected to the controller.

When an occupant is detected by the pressure sensor as sitting on the vehicle seat, the drive motor is driven under control from the controller, and air is fed from an air pump into the air bag. The air bag inflates when air is fed into the air bag, pushing the movable member out from its standby position toward front of the seat back. The outer belt is accordingly separated from the seat back by the moveable member, so a gap is formed between the outer belt and the seat back. The occupant is accordingly able to insert fingers between the outer belt and the seat back, and easily able to grab the outer belt.

However, in the vehicle seat here the structure for pushing the movable member out toward front of the seat back from its standby position is complicated due to employing an air bag and an air pump driven by a drive motor.

SUMMARY OF THE INVENTION

In consideration of the above circumstances the present invention is directed towards a webbing guide structure capable of forming a gap between webbing and a seat back by employing a simple structure.

A webbing guide structure of a first aspect of the present invention includes: a take-up device that is capable of imparting take-up force to webbing that fits over an occupant seated on a seat of a vehicle and taking up the webbing; a guide section that guides the webbing such that the webbing extends out from above a seat back of the seat toward a front side with respect to the seat back; a restricting portion provided at the webbing, that is adapted to restrict movement of the webbing due to the take-up force by abutting to the guide section; and a projecting portion that separates the webbing from the seat back as a result of the projecting portion being projected out toward a seat front side with respect to the seat back due to the take-up force acting on the webbing when the restricting portion has abutted to the guide section.

A webbing guide structure of a second aspect of the present invention is the webbing guide structure of the first aspect wherein, wherein, as a result of the restricting portion being moved with respect to the guide section due to the take-up force acting on the webbing when the restricting portion has abutted to the guide section, the projecting portion is projected out toward the seat front side with respect to the seat back together with movement of the restricting portion.

A webbing guide structure of a third aspect of the present invention is the webbing guide structure of the first aspect wherein, as a result of the guide section being moved with respect to the seat back due to the take-up force acting on the webbing when the restricting portion has abutted to the guide section, the projecting portion is projected out toward the seat front side with respect to the seat back together with movement of the guide section.

A webbing guide structure of a fourth aspect of the present invention is the webbing guide structure of any one of the first to the third aspects, wherein when the restricting portion has abutted to the guide section, the webbing is moved towards an outer side in a seat left-right direction.

In the webbing guide structure of the first aspect, the take-up device is capable of imparting take-up force to the webbing and taking up the webbing. The guide section guides the webbing such that the webbing extends out from the upper side of the seat back of the seat to the front side with respect to the seat back. The restricting portion is provided to the webbing such that when the restricting portion abuts (contacts) the guide section, movement of the webbing due to the take-up force of the take-up device is restricted.

When the restricting portion has abutted to (made contact with) the guide section, the projecting portion separates the webbing from the seat back by the projecting portion projecting out with respect to the seat back towards the seat front due the take-up force acting on the webbing. A gap is accordingly formed (provided) between the webbing and the seat back.

Due to utilizing the take-up force acting on the webbing imparted by the take-up device to project the projecting portion out with respect to the seat back towards the seat front, the need to provide a separate drive mechanism to project out the projecting portion can be eliminated. The gap between the webbing and the seat back can accordingly be provided by employing a simple structure.

In the webbing guide structure of the second aspect, as a result of the restricting portion being moved with respect to the guide section due to the take-up force acting on the webbing when the restricting portion has abutted to the guide section, the projecting portion is projected out toward the seat front side with respect to the seat back together with movement of the restricting portion.

The projecting portion can accordingly be made to project out with respect to the seat back towards the seat front by employing a simple structure.

In the second aspect, it is possible that the projecting portion is a rigid portion provided or formed at the webbing, rigidity of the rigid portion being higher than rigidity of the other portions of the webbing.

In the webbing guide structure of the third aspect, as a result of the guide section being moved with respect to the seat back due to the take-up force acting on the webbing when the restricting portion has abutted to the guide section, the projecting portion is projected out toward the seat front side with respect to the seat back together with movement of the guide section.

The projecting portion can accordingly be made to project out with respect to the seat back towards the seat front by employing a simple structure.

In the third aspect, it is possible that the projecting portion is a support section that is projected out toward the seat front side from the guide section and supports the webbing thereat.

In the webbing guide structure of the fourth aspect, when the restricting portion has abutted to the guide section, the webbing is moved towards an outer side in a seat left-right direction.

The webbing can accordingly be disposed away from the occupant. The webbing can accordingly be grabbed even more easily.

BRIEF DESCRIPTION OF THE DRAWINGS

Exemplary embodiments of the present invention will be described in detail with reference to the following figures, wherein:

FIG. 5A is a plan view from above and FIG. 5B is a cross-section viewed from the vehicle left hand side;

FIG. 6A is a plan view from above FIG. 6B is a cross-section illustrating a deconstructed state from the webbing base end side, and FIG. 6C is a cross-section as viewed from the webbing base end side;

FIG. 7A is a plan view from above and FIG. 7B is a cross-section as viewed from the vehicle left hand side;

FIG. 10A and FIG. 10B are partially cut-away plan views of relevant portions of a webbing guide structure according to a seventh exemplary embodiment of the present invention, FIG. 10A illustrates a state when the webbing is being taken up, and FIG. 10B is illustrates a state when a take-up stopper has made contact with a contact face;

FIG. 13A illustrates a state when webbing is being taken up, and FIG. 13B illustrates a state when a take-up stopper has made contact with a contact face.

DETAILED DESCRIPTION OF THE INVENTION

First Exemplary Embodiment

Figure 1:
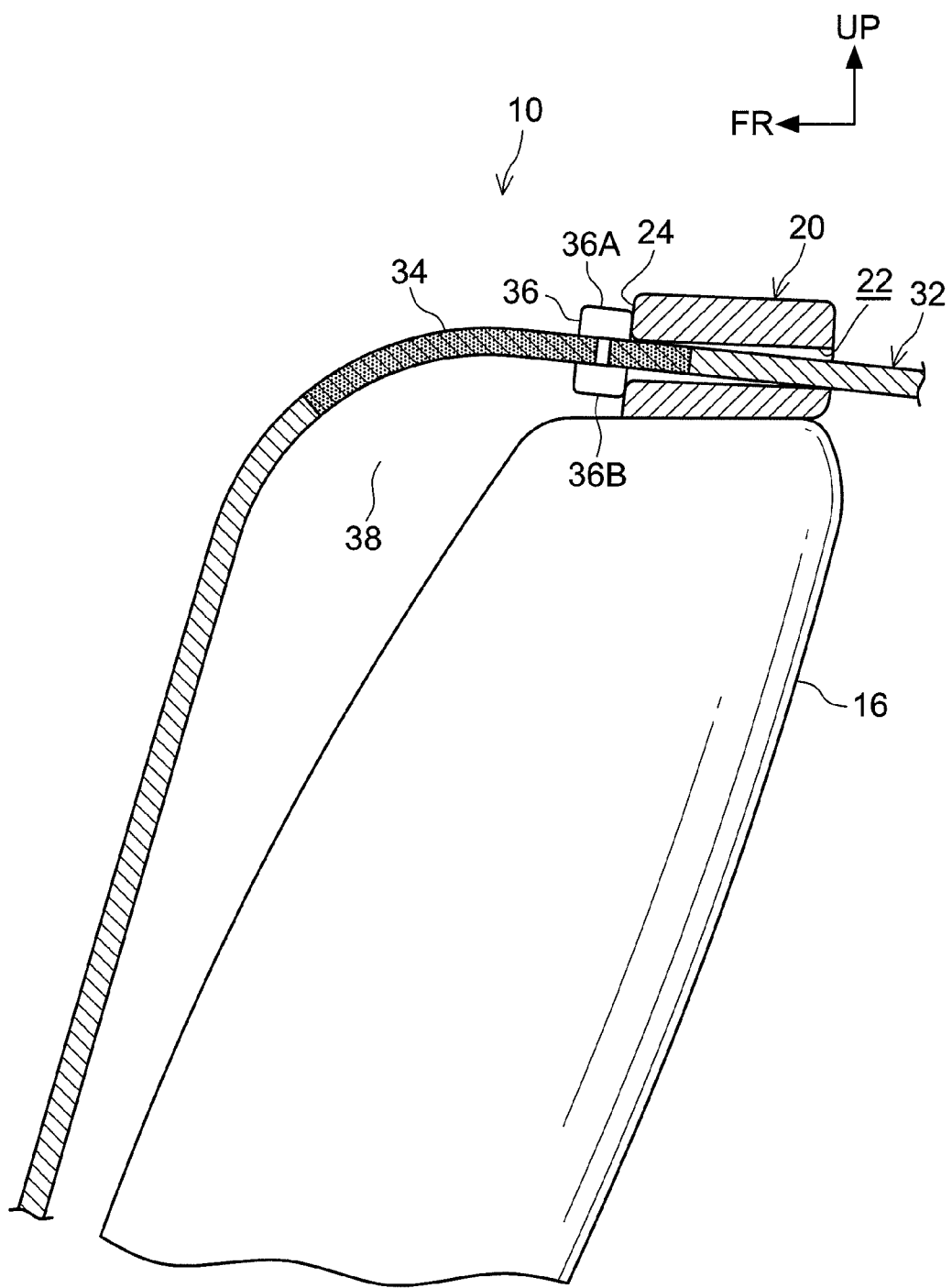
FIG. 1 is partially cut-away side view of a webbing guide structure according to a first exemplary embodiment of the present invention, as viewed from the left hand side of a vehicle.
Figure 2:
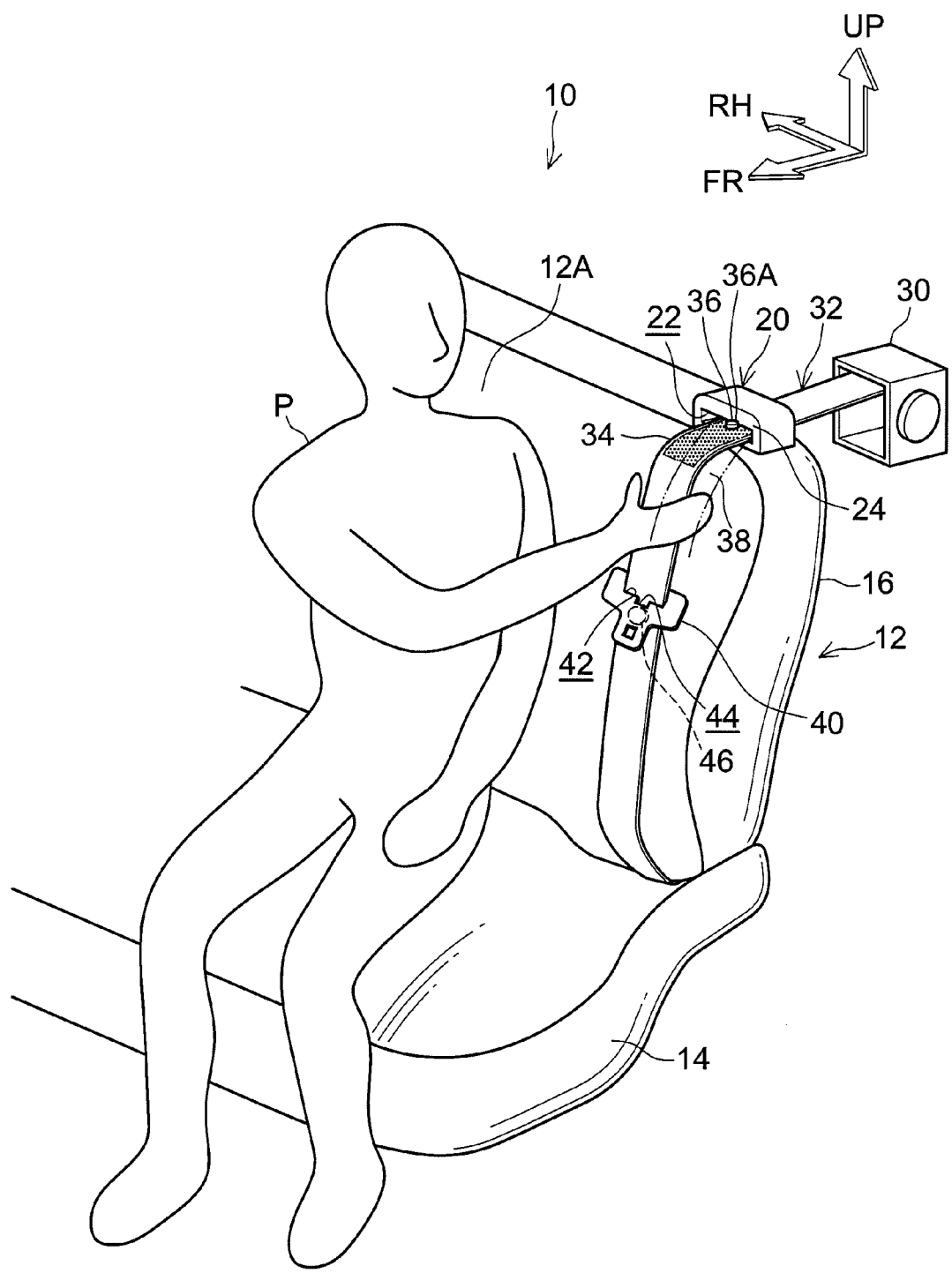
FIG. 2 is a perspective view of a webbing guide structure according to the first exemplary embodiment of the present invention as viewed from the vehicle front left hand side.
Figure 3:
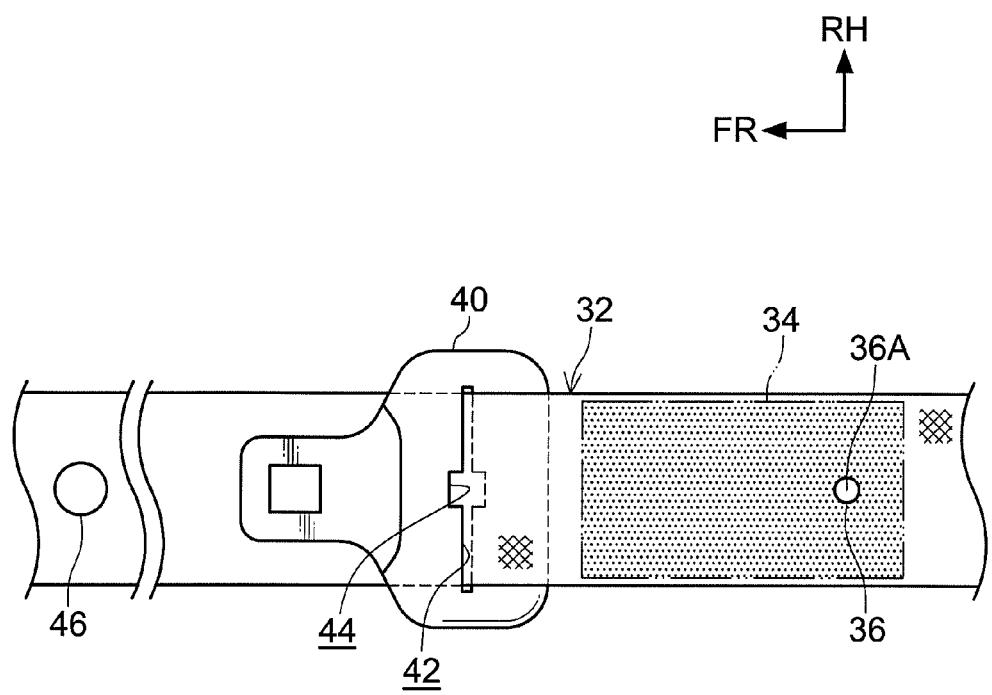
FIG. 3 is a plan view viewed from above of relevant portions of a webbing guide structure according to the first exemplary embodiment of the present invention.

FIG. 1 is partially cut-away side view of a webbing guide structure 10 according to a first exemplary embodiment of the present invention, as viewed from the left hand side of a vehicle, FIG. 2 is a perspective view of the webbing guide structure 10 as viewed from the vehicle front left hand side. FIG. 3 is a plan view from above of relevant portions of the webbing guide structure 10. In the drawings the vehicle front direction is indicated by arrow FR, the vehicle right hand side is indicated by arrow RH, and the up direction is indicated by arrow UP.

As shown in FIG. 2, a rear seat 12 is provided as a seat for an occupant P to sit on at a vehicle rear section of a vehicle compartment. The front direction of the rear seat 12 is aligned with the vehicle front direction, and the left and right directions of the rear seat 12 are aligned along the vehicle width direction. The occupant P sits on a seating region 12A of the rear seat 12.

The rear seat 12 is equipped with a rear seat cushion 14 serving as a seat cushion, and the rear seat cushion 14 is fixed so as to be disposed in a substantially horizontal state to a floor section of the vehicle. The rear seat 12 is equipped with a rear seat back 16 serving as a seat back, and the rear seat back 16 is disposed in a state so as to stand at a vehicle rear side end portion of the rear seat cushion 14.

A buckle device (not shown in the drawings) is disposed on the rear seat cushion 14 at the vehicle width direction inside of the seating region 12A, and the buckle device is attached to a portion of the vehicle floor. The buckle device is capable of retaining a tongue plate 40, which is described later.

As shown in FIG. 1, a resin made substantially rectangular tube shaped webbing guide 20 serving as a guide section is fixed to an upper portion of the rear seat back 16 at the vehicle width direction outside of the seating region 12A of the rear seat 12. A guide hole 22 profiled with a substantially rectangular cross-section is formed as a through insertion section in the webbing guide 20. The guide hole 22 passes through the webbing guide 20 along the vehicle front-rear direction. The face of the webbing guide 20 on the vehicle front side configures a contact face 24.

As shown in FIG. 2, a webbing take-up device 30 as a take-up device is provided at a portion which is at the vehicle rear side from an upper portion of the rear seat back 16, at the vehicle width direction outside of the seating region 12A of the rear seat 12. The webbing take-up device 30 is fixed to a vehicle package tray (not shown in the drawings). The webbing take-up device 30 is equipped with a drum shaped spool (not shown in the drawings) serving as a take-up shaft, and the two ends of the spool are rotatably supported from side walls of the webbing take-up device 30.

A base end portion of an elongated belt shaped flexible webbing 32 is coupled and fixed to the spool. The webbing 32 is taken up on the spool from the base end side thereof when the spool rotates in one direction about the spool axial line (this direction is referred to below as the "take-up direction"), such that the webbing 32 is housed in the webbing take-up device 30. On the other hand, when the webbing 32 is pulled out from the leading end side thereof then the webbing 32 is pulled out while the spool is rotated in the other direction about the spool axial line (this direction is referred to below as the "pullout direction").

The webbing 32 extends straight out from the webbing take-up device 30 at the above of the rear seat back 16, and is inserted through the guide hole 22 of the webbing guide 20. The webbing 32 also passes through between the vehicle rear-side edge of the rear seat cushion 14 and the bottom edge of the rear seat back 16, and a leading end portion of the webbing 32 is fixed to a vehicle floor section by an anchor (not shown in the drawings). The leading end portion of the webbing 32 is disposed to the vehicle rear side of the rear seat cushion 14 at the vehicle width direction outside of the seating region 12A.

The webbing take-up device 30 is equipped with a spiral spring (not shown in the drawings) serving as a biasing member. The spiral spring biases the spool in the take-up direction such that take-up force acts on the webbing 32. Accordingly, when the webbing 32 has been pulled out from the webbing take-up device 30, the webbing 32 is storable in the webbing take-up device 30 by taking up the webbing 32 on the spool using the biasing force (take-up force) of the spiral spring.

As shown in FIG. 1 to FIG. 3, a substantially rectangular shaped rigid portion 34 as a projecting portion is provided at an intermediate portion of the webbing 32 in a length direction of the webbing 32. Resin is impregnated at the rigid portion 34 of the webbing 32. The webbing 32 accordingly has some flexibility at the rigid portion 34, the rigidity of the rigid portion 34 is higher than the rigidity of other portions of the webbing 32.

A substantially cylindrical pillar shaped take-up stopper 36 as a restricting portion is provided, at a central portion of the webbing 32 in a width direction of the webbing 32, at one end portion of the rigid portion 34 in a length direction of the rigid portion 34 (at the base end side of the webbing 32). The take-up stopper 36 projects out from the front face (the face on the opposite side to the rear seat back 16) and from the back face (the face on the rear seat back 16 side) of the rigid portion 34. The take-up stopper 36 includes a cylindrical pillar shaped stopper portion 36A with enlarged diameter which is provided at one end side of the take-up stopper 36 in an axial direction of the take-up stopper 36 (end side of the take-up stopper 36, which is at the front face side of the rigid portion 34), and a cylindrical pillar shaped stopper portion 36B with enlarged diameter which is provided at the other end side of the take-up stopper 36 in the axial direction of the take-up stopper 36 (end side of the take-up stopper 36, which is at the back face side of the rigid portion 34). The rigid portion 34 is sandwiched between the stopper portion 36A and the stopper portion 36B, coupling the rigid portion 34 to the take-up stopper 36.

The external diameter dimension of the stopper portion 36B is set the same as the external diameter dimension of the stopper portion 36A, and the axial direction dimension of the take-up stopper 36 is set larger than the up-down direction dimension of the guide hole 22 of the webbing guide 20. Accordingly, due to take-up force acting on the webbing 32 by the spiral spring of the webbing take-up device 30, outer peripheral faces of the stopper portion 36A and the stopper portion 36B of the take-up stopper 36 make contact (press against) the contact face 24 of the webbing guide 20. In this state, the webbing 32 extends out from the guide hole 22 towards the vehicle front-side and curves at the other end portion of the rigid portion 34 in the length direction of the rigid portion 34 so as to extend downwards, providing (forming) a gap (space) 38 between the webbing 32 and the rear seat back 16, below the rigid portion 34.

A substantially cylindrical pillar shaped tongue stopper 46 is provided further to the leading end side of the webbing 32 than the rigid portion 34. The tongue stopper 46 is disposed at a central portion of the webbing 32 in the width direction of the webbing 32. The tongue stopper 46 projects out from the front face (the face on the opposite side to the rear seat back 16) and from the back face (the face on the rear seat back 16 side) of the webbing 32.

The tongue plate 40 is provided at an intermediate portion of the webbing 32 in the length direction of the webbing 32, at a position on the vehicle front-side with respect to the rear seat back 16. An elongated slit 42 is formed so as to pass through the tongue plate 40, and the webbing 32 is inserted through inside the slit 42. The tongue plate 40 is accordingly movable with respect to the webbing 32. In the tongue plate 40, a pass-through hole 44 of rectangular shaped cross-section is formed so as to pass through the tongue plate 40 at a central portion of the slit 42 in a length direction of the slit 42. The pass-through hole 44 is in communication with the slit 42 at a central portion of the pass-through hole 44 in a width direction of the pass-through hole 44 (the width direction of the pass-through hole 44 is orthogonal to the length direction of the slit 42). Dimension in the width direction of the pass-through hole 44 is set larger than dimension of the take-up stopper 36 in the axial direction of the take-up stopper 36, and dimension in a length direction (the length direction of the pass-through hole 44 is parallel to the length direction of the slit 42) of the pass-through hole 44 is set larger than the external diameter dimension of the stopper portion 36A and the stopper portion 36B. Accordingly the take-up stopper 36 is able to pass through inside the pass-through hole 44 such that movement of the tongue plate 40 is not restricted by the take-up stopper 36. Further, the dimension in the length direction of the pass-through hole 44 is set smaller than the external diameter dimension of the tongue stopper 46, such that the tongue stopper 46 is not able to pass through the pass-through hole 44. Movement of the tongue plate 40 towards the leading end direction side of the webbing 32 is accordingly restricted by the tongue stopper 46. The tongue plate 40 is capable of being retained by the buckle device.

Explanation follows regarding operation of the first exemplary embodiment.

When the occupant P grabs the webbing 32 at the vehicle front direction side of the rear seat back 16 and pulls the webbing 32 against biasing force of the spiral spring of the webbing take-up device 30, the webbing 32 is pulled out from the webbing take-up device 30 while rotating the spool of the webbing take-up device 30 in the pullout direction.

Figure 4:
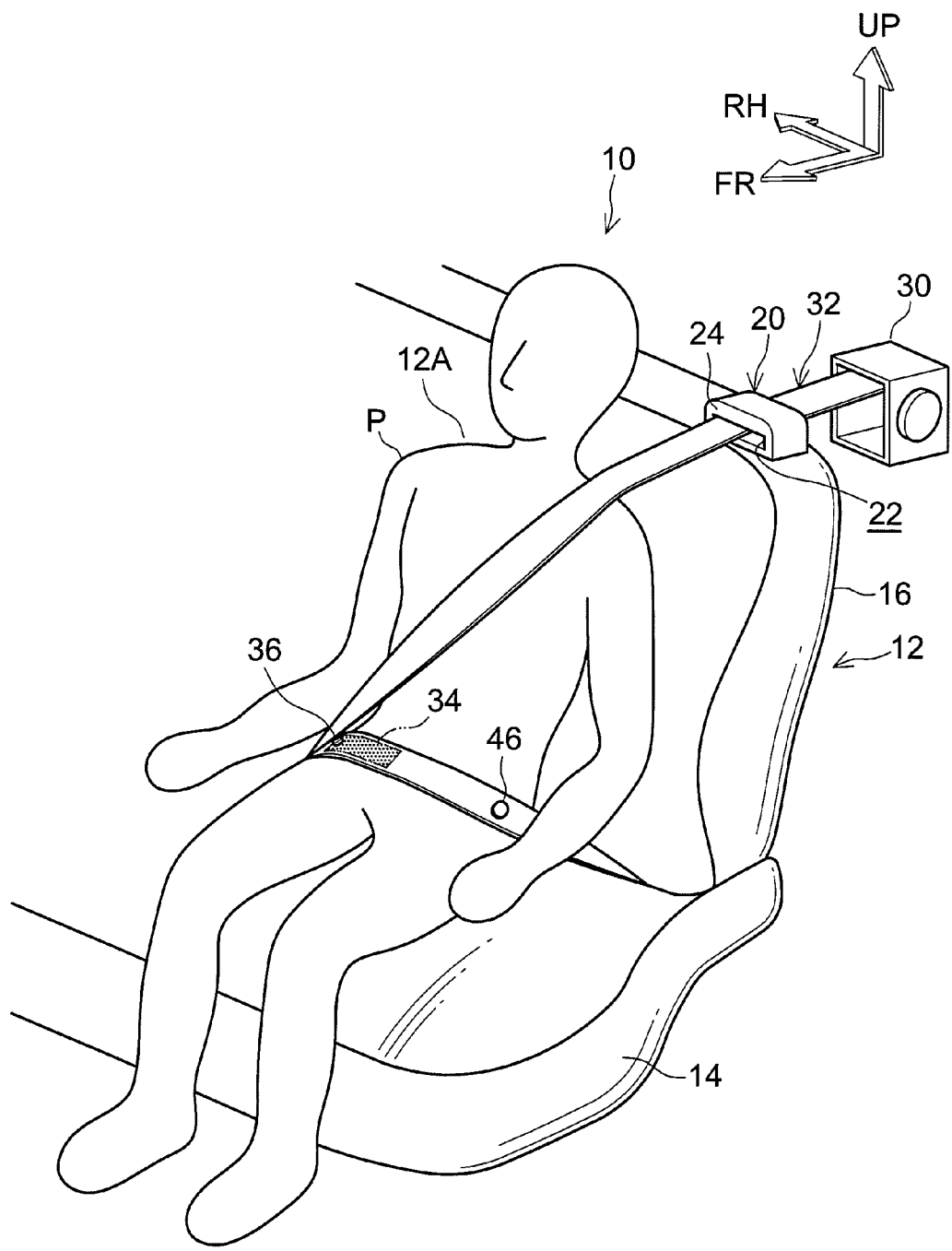
FIG. 4 is a perspective view of a webbing guide structure according to the first exemplary embodiment of the present invention as viewed from the vehicle front left hand side, illustrating a state in which webbing has been fitted around an occupant.

The pulled-out webbing 32 is then brought across the body of the occupant P, and the webbing 32 is fitted to the body of the occupant P (see FIG. 4) by the buckle device retaining the tongue plate 40 provided at the length direction intermediate portion of the webbing 32.

When the webbing 32 has been fitted over the body of the occupant P, the webbing 32 is disposed so as to slant downwards on progression towards the vehicle width direction inside, from the webbing guide 20 to the tongue plate 40, on the vehicle front side of the upper part of the body of the occupant P. Further, the webbing 32 is disposed across from the tongue plate 40 towards the vehicle width direction outside to the anchor, on the vehicle front-side of the waist region (stomach region) of the occupant P.

Furthermore, when the webbing 32 has been fitted over the body of the occupant P, the tongue plate 40 is disposed further to the base end side of the webbing 32 than the rigid portion 34, due to the take-up stopper 36 passing through inside the pass-through hole 44 of the tongue plate 40 when the webbing 32 is being fitted over the body of the occupant P, and the rigid portion 34 is disposed at the waist region of the occupant P.

When retention of the tongue plate 40 by the buckle device is released, the spool of the webbing take-up device 30 rotates in the take-up direction due to biasing force (take-up force) from the spiral spring, resulting in the webbing 32 being taken up on the spool. The take-up stopper 36 accordingly passes through the pass-through hole 44 of the tongue plate 40 and moves towards the guide hole 22 of the webbing guide 20.

The take-up stopper 36 makes contact with contact face 24 of the webbing guide 20 when the take-up stopper 36 has moved towards the guide hole 22. When this occurs, the take-up stopper 36 is rotated (moved) by the take-up force acting on the webbing 32 arising from the spiral spring biasing force, and the outer peripheral faces of the stopper portion 36A and the stopper portion 36B of the take-up stopper 36 make contact with the contact face 24.

Due to the one end portion of the rigid portion 34 in the length direction of the rigid portion 34 being sandwiched between the stopper portion 36A and the stopper portion 36B, the one end portion of the rigid portion 34 in the length direction of the rigid portion 34 is supported by the webbing guide 20 via the take-up stopper 36. The rigidity of the rigid portion 34 is higher than the rigidity of other portions of the webbing 32. Accordingly the rigid portion 34 extends out towards the vehicle front-side from the webbing guide 20, and a portion of the rigid portion 34 further to the other end portion of the rigid portion 34 in the length direction of the rigid portion 34 than the take-up stopper 36 projects out to the vehicle front-side with respect to the rear seat back 16 while holding up the webbing 32. Namely, in the webbing 32, the rigid portion 34 serves as a cantilever beam with the one end portion of the rigid portion 34 in the length direction of the rigid portion 34 being as a support point. The webbing 32 is accordingly separated from the rear seat back 16, providing a gap 38 between the webbing 32 and the rear seat back 16. Accordingly, the occupant P can introduce fingers into the gap 38 and is easily able to grab the webbing 32.

According to the configuration described above, utilizing the biasing force (take-up force) of the spiral spring of the webbing take-up device 30 to make the rigid portion 34 project out towards the vehicle front from the rear seat back 16 means that the need to provide a separate drive mechanism in order to project out the rigid portion 34 can be eliminated. The gap 38 between the webbing 32 and the rear seat back 16 can accordingly be provided by employing a simple structure.

When the take-up stopper 36 abuts the webbing guide 20, the take-up stopper 36 is rotated (moved) relative to the webbing guide 20 by the take-up force acting on the webbing 32 arising from biasing force (take-up force) of the spiral spring of the webbing take-up device 30, thereby projecting the rigid portion 34 out to the vehicle front-side from the rear seat back 16 together with rotating the take-up stopper 36.

Consequently, the rigid portion 34 can be projected out to the vehicle front-side with respect to the rear seat back 16 by employing a simple structure.

Furthermore, the take-up stopper 36 of the webbing 32 is able to pass through inside the pass-through hole 44 of the tongue plate 40 when the webbing 32 is being fitted around the body of the occupant P. The length of the webbing 32 from the tongue plate 40 to the anchor can accordingly be set to a length corresponding to the frame of the occupant P.

When the webbing 32 has been fitted over the body of the occupant P, any strange feeling imparted to the occupant P by the rigid portion 34 can be reduced due to the rigid portion 34 being disposed at the waist region of the occupant P.

The rigid portion 34 is projected out to the vehicle front-side with respect to the rear seat back 16 using the take-up force acting on the webbing 32 arising from biasing force of the spiral spring of the webbing take-up device 30. Accordingly, even if the occupant P is to knock against (interfere with) the rigid portion 34 when the occupant P is getting into the vehicle, contact between the take-up stopper 36 and the contact face 24 is readily released and the rigid portion 34 is able to move. The occupant P can accordingly be protected.

Second Exemplary Embodiment

Figure 5A:
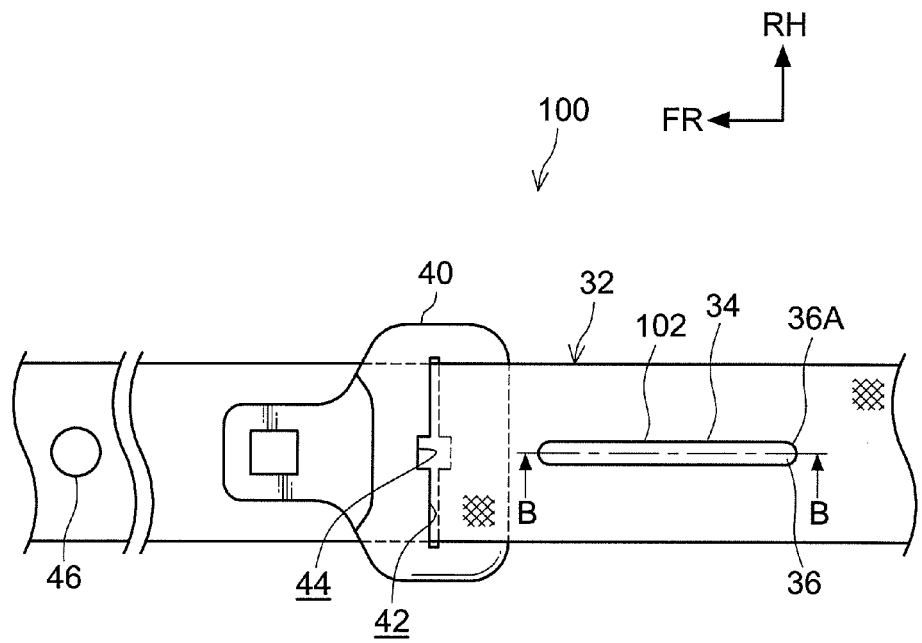
FIG. 5A and FIG. 5B are diagrams illustrating relevant portions of a webbing guide structure according to a second exemplary embodiment of the present invention.
Figure 5B:
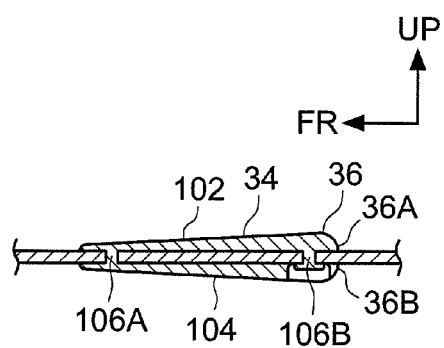

FIG. 5A is a plan view from above of relevant portions of a webbing guide structure 100 according to a second exemplary embodiment of the present invention, and FIG. 5B is a cross-section viewed from the vehicle left hand side of relevant portions of the webbing guide structure 100. In the drawings the vehicle front direction is indicated by arrow FR, the vehicle right hand side is indicated by arrow RH, and the up direction is indicated by arrow UP.

The second exemplary embodiment is substantially similar in configuration to the first exemplary embodiment but differs in the following points.

As shown in FIG. 5A and FIG. 5B, in the second exemplary embodiment the rigid portion 34 and the take-up stopper 36 are integrally configured by a first rigid portion 102 and a second rigid portion 104.

The first rigid portion 102 is disposed at a central portion of the webbing 32 in the width direction of the webbing 32 on the front face of the webbing 32 (the face on the opposite side to the rear seat back 16). The first rigid portion 102 is formed as an elongated shape aligned with the length direction of the webbing 32. The thickness of the first rigid portion 102 in a direction orthogonal to the front face of the webbing 32 gradually increases on progression towards the base end side of the webbing 32.

Then second rigid portion 104 is disposed at a central portion of the webbing 32 in the width direction of the webbing 32 on the back face of the webbing 32 (the face on the rear seat back 16 side). The second rigid portion 104 is formed as an elongated shape aligned with the length direction of the webbing 32. The thickness of the second rigid portion 104 in a direction orthogonal to the back face of the webbing 32 gradually increases on progression towards the base end side of the webbing 32.

A coupling portion 106A is provided between the first rigid portion 102 and the second rigid portion 104 at the webbing 32 leading end side. The coupling portion 106A passes through the webbing 32. A coupling portion 106B is also provided between the first rigid portion 102 and the second rigid portion 104 at the webbing 32 base end side. The coupling portion 106B passes through the webbing 32. The first rigid portion 102 and the second rigid portion 104 are accordingly coupled together by the coupling portion 106A and the coupling portion 106B, so as to sandwich the webbing 32.

The portion of the webbing 32 where the first rigid portion 102 and the second rigid portion 104 are provided, except for portions at the webbing 32 base end sides thereof, configures a rigid portion 34. The webbing 32 base end side portions of the first rigid portion 102 and the second rigid portion 104 configure a take-up stopper 36. The webbing 32 base end side portion of the first rigid portion 102 configures a stopper portion 36A of the take-up stopper 36, and the webbing 32 base end side portion of the second rigid portion 104 configures a stopper portion 36B of the take-up stopper 36.

The dimension in the width direction of the pass-through hole 44 of the tongue plate 40 is set larger than the maximum thickness dimension of the take-up stopper 36 in the direction orthogonal to the face of the webbing 32. The dimension in the length direction of the pass-through hole 44 is set larger than the dimension of the take-up stopper 36 along the webbing 32 width direction. The first rigid portion 102 and the second rigid portion 104 are accordingly able to pass through inside the pass-through hole 44.

Similar operation and effects are exhibited by the second exemplary embodiment to those of the first exemplary embodiment.

Third Exemplary Embodiment

Figure 6A:
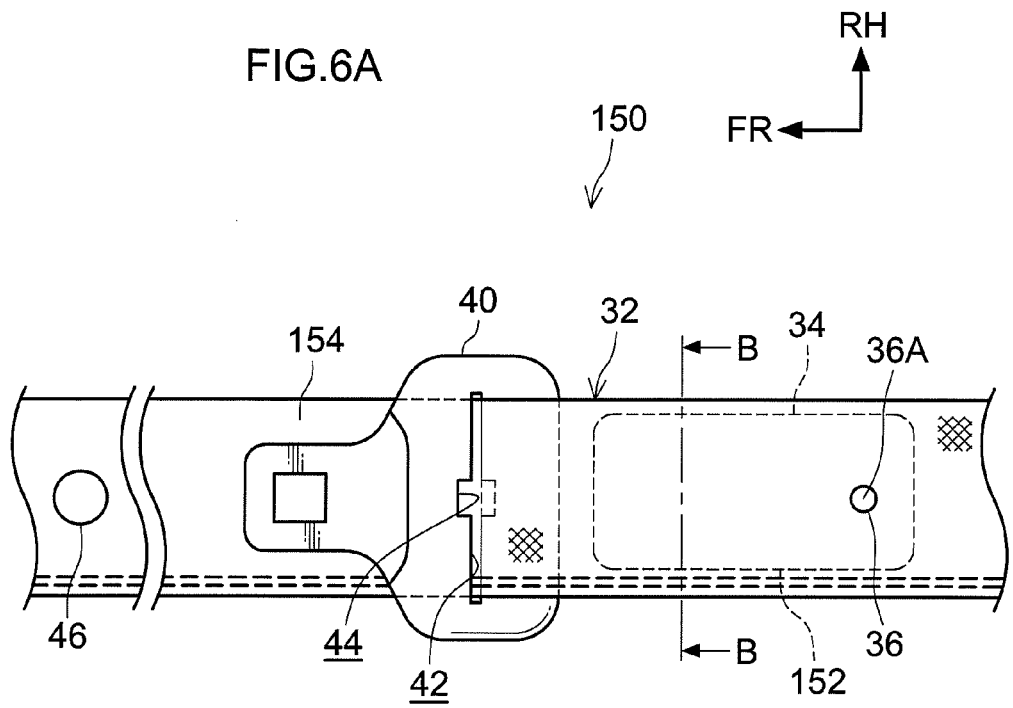
FIGS. 6A, 6B and 6C are diagrams of relevant portions of a webbing guide structure according to a third exemplary embodiment of the present invention.
Figure 6B:
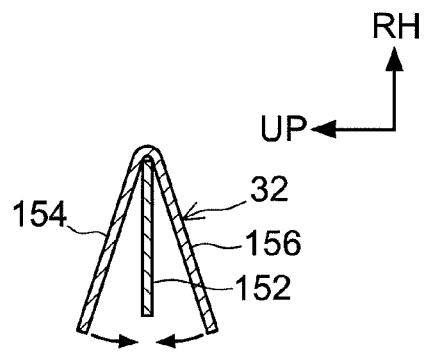
Figure 6C:
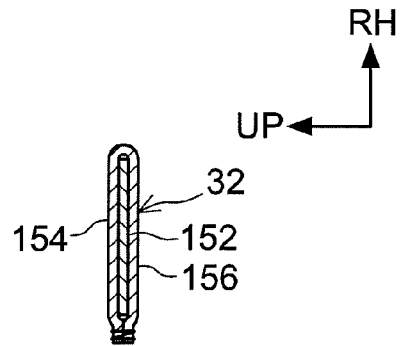

FIG. 6A is a plan view from above of relevant portions of a webbing guide structure 150 according to a third exemplary embodiment of the present invention, FIG. 6B is a cross-section of relevant portions of the webbing guide structure 150 as viewed in a deconstructed state from the webbing 32 base end side, and FIG. 6C is a cross-section of relevant portions of the webbing guide structure 150 as viewed from the webbing 32 base end side. In the drawings the vehicle front direction is indicated by arrow FR, the vehicle right hand side is indicated by arrow RH, and the up direction is indicated by arrow UP.

The third exemplary embodiment is substantially similar in configuration to the first exemplary embodiment but differs in the following points As shown in FIG. 6A to FIG. 6C, in the third exemplary embodiment the webbing 32 is configured by a front side member 154 and a back side member 156. One width direction edge of the front side member 154 and one width direction edge of the back side member 156 are connected so as to integrate the front side member 154 and the back side member 156 together. The webbing 32 is configured by folding over the front member 154 and the rear member 156 at the connection portion.

A resin formed substantially rectangular shaped rigid plate 152 is provided at a rigid portion 34 of the webbing 32. The other width direction edge of the front side member 154 and the other width direction edge of the back side member 156 are stitched together in a state of the rigid plate 152 being sandwiched between the front side member 154 and the back side member 156.

A take-up stopper 36 passes through the front side member 154, the rigid plate 152 and the back side member 156, with a stopper portion 36A of the take-up stopper 36 projecting out from the front face of the webbing 32 (the face on the opposite side to the rear seat back 16) and a stopper portion 36B of the take-up stopper 36 projecting out from the back face of the webbing 32 (the face on the rear seat back 16 side). The webbing 32 (the front side member 154 and the back side member 156) and the rigid plate 152 are accordingly sandwiched between the stopper portion 36A and the stopper portion 36B.

Similar operation and effects are exhibited by the third exemplary embodiment to those of the first exemplary embodiment.

In the third exemplary embodiment, the webbing 32 is configured by stitching together the other width direction edge of the front side member 154 and the other width direction edge of the back side member 156 in a state of being folded over the front side member 154 and the back side member 156 at the connecting portion with the rigid plate 152 in a sandwiched state therebetween. Alternatively the webbing 32 may be configured by folding over the front side member 154 and the back side member 156 at the connecting portion, stitching together the other width direction edges of the front side member 154 and the back side member 156, thereafter, inserting the rigid plate 152 between the front side member 154 and the back side member 156, such that the rigid plate 152 is sandwiched between the front side member 154 and the back side member 156.

Fourth Exemplary Embodiment

Figure 7A:
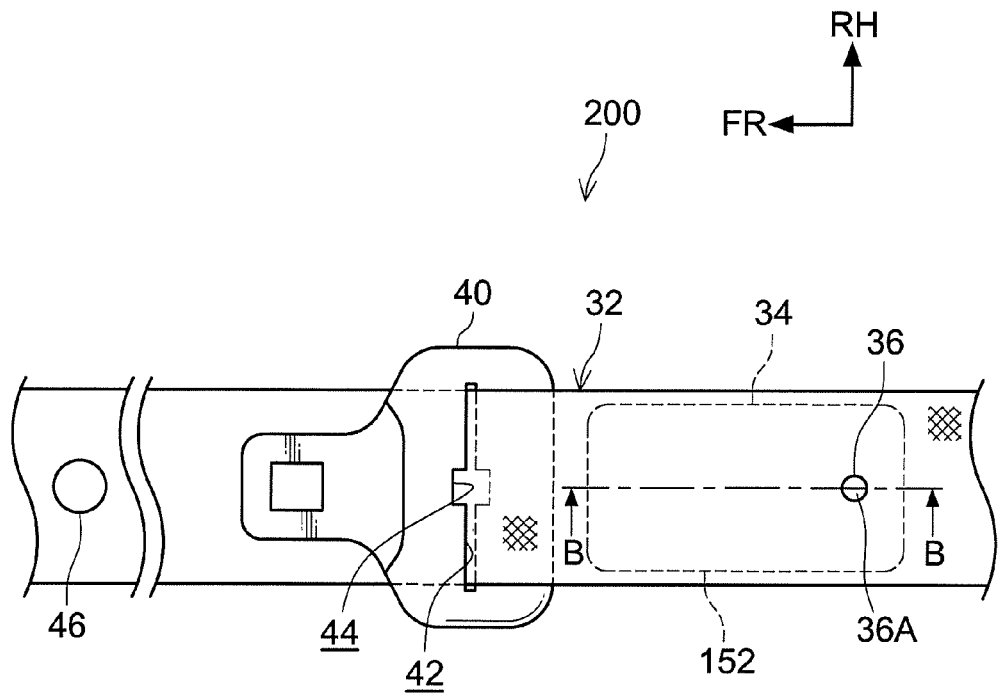
FIG. 7A and FIG. 7B are diagrams of relevant portions of a webbing guide structure according to a fourth exemplary embodiment of the present invention.
Figure 7B:
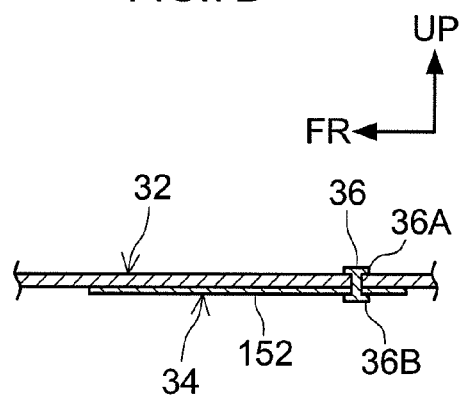

FIG. 7A is a plan view from above of relevant portions of a webbing guide structure 200 according to a fourth exemplary embodiment of the present invention, FIG. 7B is a cross-section of relevant portions of the webbing guide structure 200 as viewed from the vehicle left hand side. In the drawings the vehicle front direction is indicated by arrow FR, the vehicle right hand side is indicated by arrow RH, and the up direction is indicated by arrow UP.

The fourth exemplary embodiment is substantially similar in configuration to the first exemplary embodiment but differs in the following points.

As shown in FIG. 7A and FIG. 7B, in the fourth exemplary embodiment, in a rigid portion 34 of the webbing 32, a rigid plate 152 of the third exemplary embodiment is provided on the back face (the face on the rear seat back 16 side) of the webbing 32, and the rigid plate 152 is bonded to the webbing 32.

A take-up stopper 36 passes through the webbing 32 and the rigid plate 152, with a stopper portion 36A of the take-up stopper 36 projecting out from the front face of the webbing 32 (the face on the opposite side to the rear seat back 16) and a stopper portion 36B of the take-up stopper 36 projecting out from the back face of the webbing 32. The webbing 32 and the rigid plate 152 are sandwiched between the stopper portion 36A and the stopper portion 36B.

The fourth exemplary embodiment exhibits the same operation and effects as those of the first exemplary embodiment.

In the fourth exemplary embodiment the rigid plate 152 is bonded to the webbing 32. Alternatively configuration may be made with the rigid plate 152 welded to the webbing 32.

Fifth Exemplary Embodiment

Figure 8:
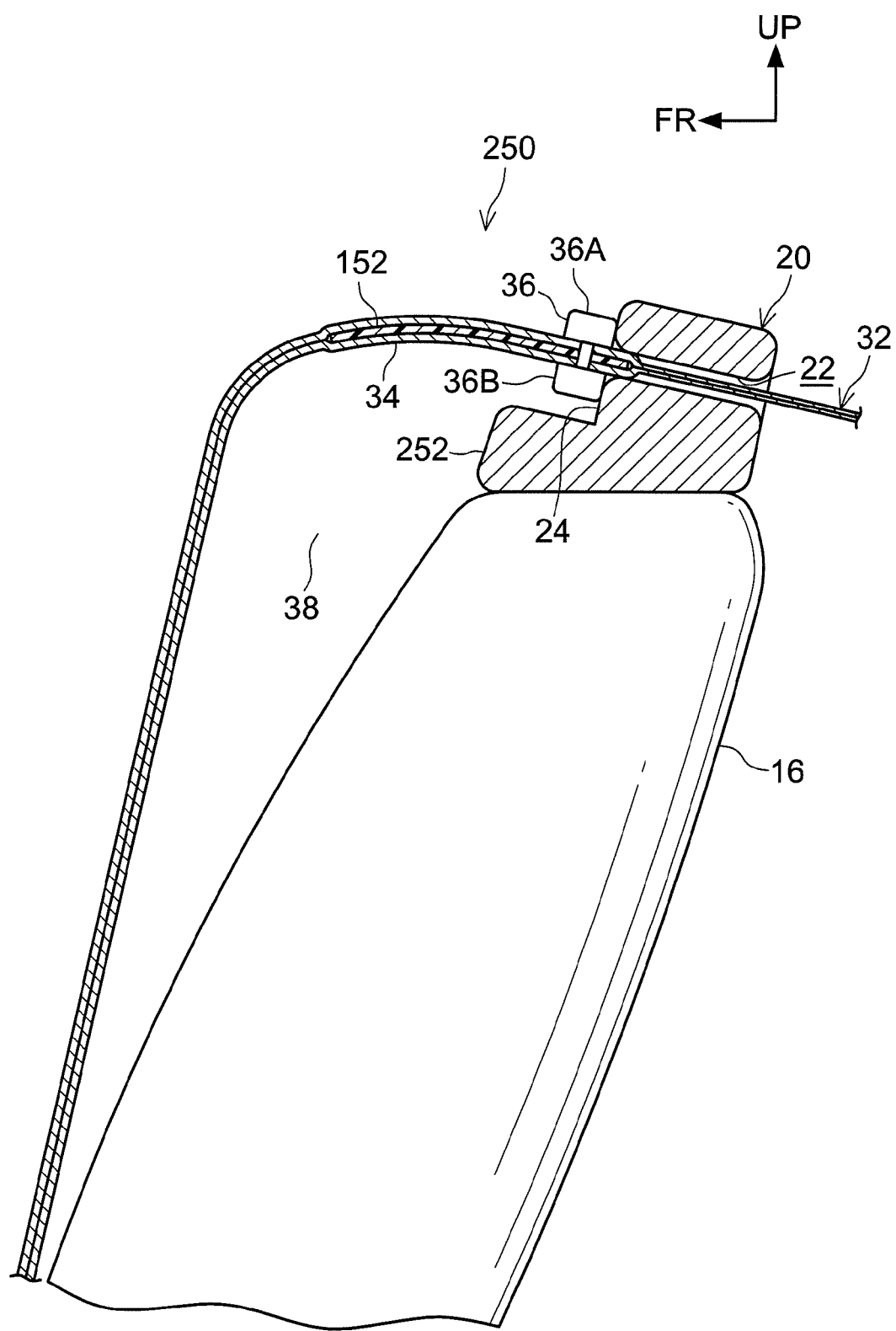
FIG. 8 is a partially cut-away side view of a webbing guide structure according to a fifth exemplary embodiment of the present invention, as viewed from the vehicle left hand side.

FIG. 8 is a partially cut-away side view of relevant portions of a webbing guide structure 250 according to a fifth exemplary embodiment of the present invention as viewed from the vehicle left hand side. In the drawings the vehicle front direction is indicated by arrow FR, the vehicle right hand side is indicated by arrow RH, and the up direction is indicated by arrow UP.

The fifth exemplary embodiment is substantially similar in configuration to the third exemplary embodiment but differs in the following points.

As shown in FIG. 8, in the fifth exemplary embodiment, a contact face 24 of the webbing guide 20 slopes to the vehicle rear-side on progression upwards. The guide hole 22 of the webbing guide 20 slopes downwards on progression towards the vehicle rear-side as it passes through the webbing guide 20. A flange portion 252 is provided to a lower side portion at a portion at the vehicle front-side of the webbing guide 20, and the flange portion 252 projects out to the vehicle front-side with respect to the contact face 24.

The fifth exemplary embodiment also exhibits similar operation and effects to those of the first exemplary embodiment.

Furthermore, in the fifth exemplary embodiment, due to the contact face 24 of the webbing guide 20 sloping to the vehicle rear-side on progression upwards, the rigid portion 34 is disposed so as to slope upwards on progression towards the vehicle front side.

Accordingly a portion of the rigid portion 34 further towards the other end portion of the rigid portion 34 in the length direction of the rigid portion 34 than the take-up stopper 36 can be separated from the rear seat back 16 by a larger amount. The gap 38 between the webbing 32 and the rear seat back 16 can accordingly be made larger, making it even easier for the occupant P to grab the webbing 32.

Sixth Exemplary Embodiment

Figure 9:
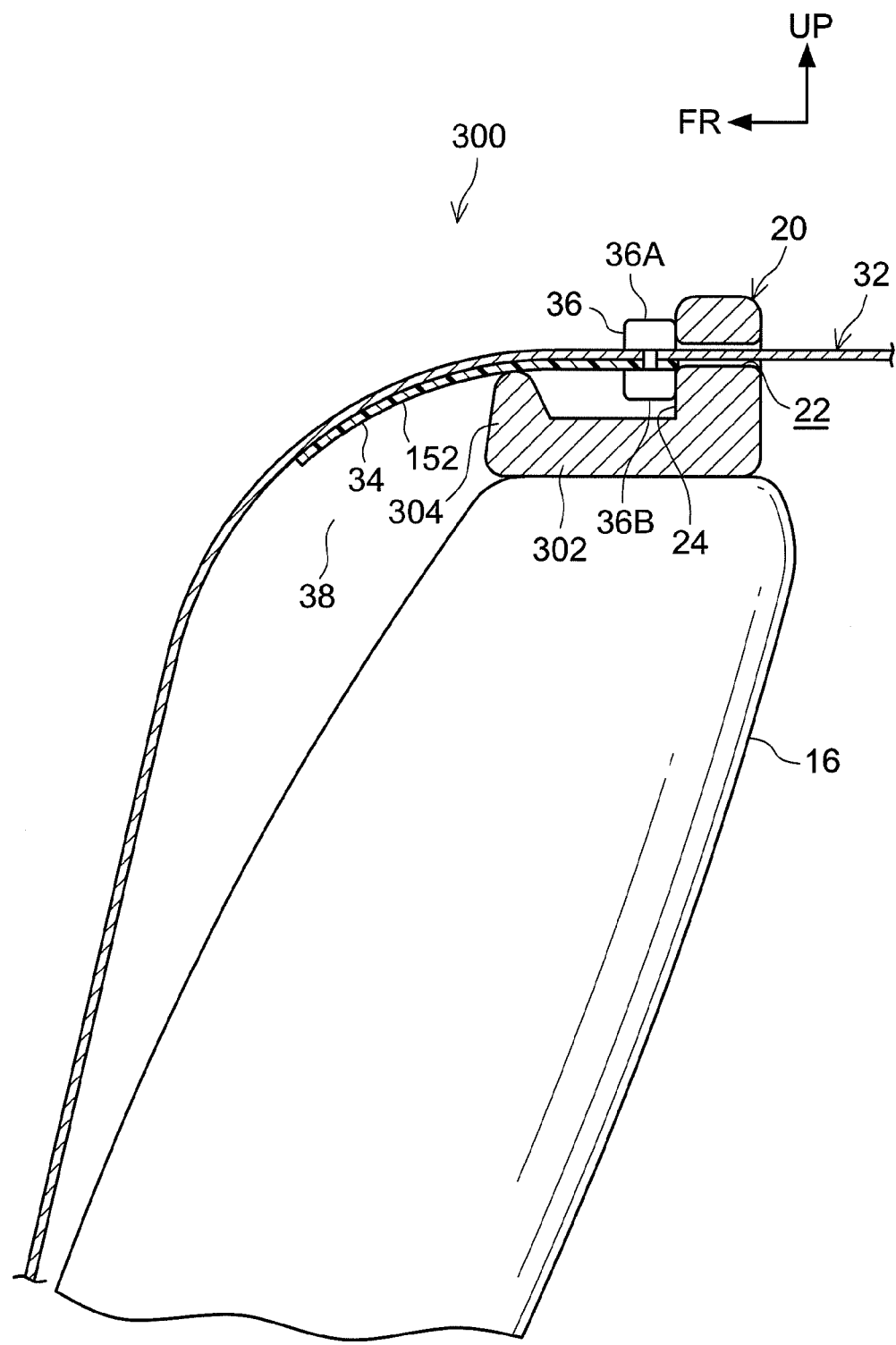
FIG. 9 is a partially cut-away side view of a webbing guide structure according to a sixth exemplary embodiment of the present invention, as viewed from the vehicle left hand side.

FIG. 9 is a partially cut-away side view of relevant portions of a webbing guide structure 300 according to a sixth exemplary embodiment of the present invention, as viewed from the vehicle left hand side. In the drawings the vehicle front direction is indicated by arrow FR, the vehicle right hand side is indicated by arrow RH, and the up direction is indicated by arrow UP.

The sixth exemplary embodiment is substantially similar in configuration to the fourth exemplary embodiment but differs in the following points.

As shown in FIG. 9, in the sixth exemplary embodiment, a projecting section 302 is provided at a lower side portion of the webbing guide 20 to a portion at the vehicle front-side of the webbing guide 20. The projecting section 302 projects out to the vehicle front-side with respect to the contact face 24 of the webbing guide 20. At the vehicle front-side portion of the projecting section 302, a support portion 304 of substantially triangular shaped cross-section is provided. The support portion 304 projects out upwards from the projecting section 302. An intermediate portion of the rigid portion 34 in the length direction of the rigid portion 34 of the webbing 32 makes contact with the support portion 304, and the rigid portion 34 is supported by the support portion 304.

The sixth exemplary embodiment exhibits similar operation and effects to those of the first exemplary embodiment.

Furthermore, in the sixth exemplary embodiment, the support portion 304 makes contact with the intermediate portion of the rigid portion 34 in the length direction of the rigid portion 34, thereby further supporting the rigid portion 34. Accordingly the amount of deflection (sagging) can be reduced for a portion of the rigid portion 34, which is from the support portion 304 to the other end portion of the rigid portion 34 in the length direction of the rigid portion 34. The gap 38 between the webbing 32 and the rear seat back 16 can accordingly be suppressed from becoming smaller.

Seventh Exemplary Embodiment

FIG. 10A is a partially cut-away plan view from above of a webbing guide structure 350 according to a seventh exemplary embodiment of the present invention illustrating a state when the webbing 32 is being taken up, and FIG. 10B is a partially cut-away plan view from above illustrating a state when the take-up stopper 36 has made contact with the contact face 24. In the drawings the vehicle front direction is indicated by arrow FR, the vehicle right hand side is indicated by arrow RH, and the up direction is indicated by arrow UP.

The seventh exemplary embodiment is substantially similar in configuration to the first exemplary embodiment but differs in the following points.

As shown in FIG. 10A, in the seventh exemplary embodiment, a sloping portion 352 is provided to the stopper portion 36A of the take-up stopper 36 at a portion on the webbing 32 base end side. The sloping portion 352 slopes towards the webbing 32 leading end side on progression towards the vehicle width direction outside. A sloping portion 354 is also provided to the stopper portion 36B of the take-up stopper 36 at a portion on the webbing 32 base end side. The sloping portion 354 also slopes towards the webbing 32 leading end side on progression towards the vehicle width direction outside. The sloping portion 352 and the sloping portion 354 are disposed in the same flat plane as each other.

The seventh exemplary embodiment also exhibits similar operation and effects to those of the first exemplary embodiment.

Furthermore, in the seventh exemplary embodiment, as shown in FIG. 10B, the sloping portion 352 and the sloping portion 354 are provided to the take-up stopper 36, with the sloping portion 352 and the sloping portion 354 sloping towards the webbing 32 leading end side on progression towards the vehicle width direction outside. Consequently, when the sloping portion 352 and the sloping portion 354 contact the contact face 24 of the webbing guide 20, due to the take-up force acting on the webbing 32 arising from the spiral spring biasing force of the webbing take-up device 30, a portion of the rigid portion 34, which is further towards the other end portion of the rigid portion 34 in the length direction of the rigid portion 34 than the take-up stopper 36 (the portion of the webbing 32 leading end side) is not only projected out to the vehicle front side with respect to the rear seat back 16 but is also rotated (moved) towards the vehicle width direction outside. The webbing 32 can accordingly be disposed so as to be separated away from the occupant P. The webbing 32 can accordingly be grabbed even more easily.

Eighth Exemplary Embodiment

Figure 11:
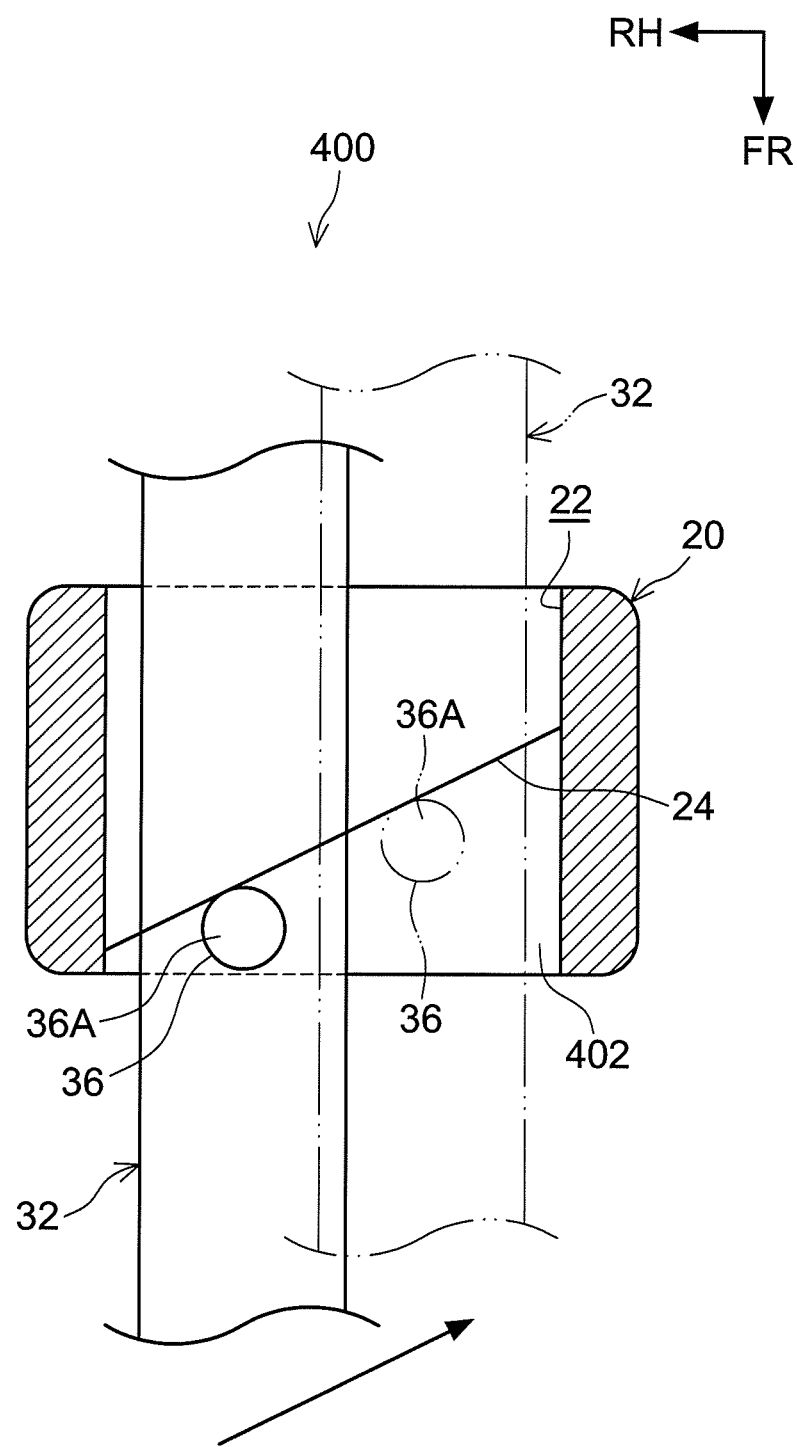
FIG. 11 is a partially cut-away plan view from above of relevant portions of a webbing guide structure according to an eighth exemplary embodiment of the present invention.

FIG. 11 is a partially cut-away cross-section viewed from above of a webbing guide structure 400 according to an eighth exemplary embodiment of the present invention. In the drawings the vehicle front direction is indicated by arrow FR, the vehicle right hand side is indicated by arrow RH, and the up direction is indicated by arrow UP.

The eighth exemplary embodiment is substantially similar in configuration to the first exemplary embodiment but differs in the following points.

As shown in FIG. 11, in the eighth exemplary embodiment, a concave portion (an cavity) 402 is provided to a face of the webbing guide 20 on the vehicle front-side. The cavity 402 is in communication with the guide hole 22. The up-down direction dimension of the cavity 402 is set larger than the up-down direction dimension of the guide hole 22, and the guide hole 22 is disposed at an up-down direction intermediate portion of the cavity 402. The up-down direction dimension of the cavity 402 is set larger than the dimension of the take-up stopper 36 in the axial direction of the take-up stopper 36 (in the thickness direction of the webbing 32), such that the take-up stopper 36 is insertable into the cavity 402. The face of the cavity 402 on the vehicle rear-side configures a contact face 24. The contact face 24 slopes to the vehicle rear-side on progression towards the vehicle width direction outside.

The eighth exemplary embodiment also exhibits similar operation and effects to those of the first exemplary embodiment.

Furthermore, in the eighth exemplary embodiment, the contact face 24 of the webbing guide 20 slopes to the vehicle rear direction side on progression towards the vehicle width direction outside. Accordingly, when the stopper portion 36A and the stopper portion 36B of the take-up stopper 36 contact the contact face 24 of the webbing guide 20, the take-up stopper 36 (the webbing 32) is moved along the contact face 24 towards the vehicle width direction outside (see the arrow indicated in FIG. 11) by the take-up force acting on the webbing 32 arising from the biasing force of the spiral spring of the webbing take-up device 30. The webbing 32 can accordingly be disposed away from the occupant P. Consequently, the occupant P can even more easily grab the webbing 32.

Ninth Exemplary Embodiment

Figure 12:
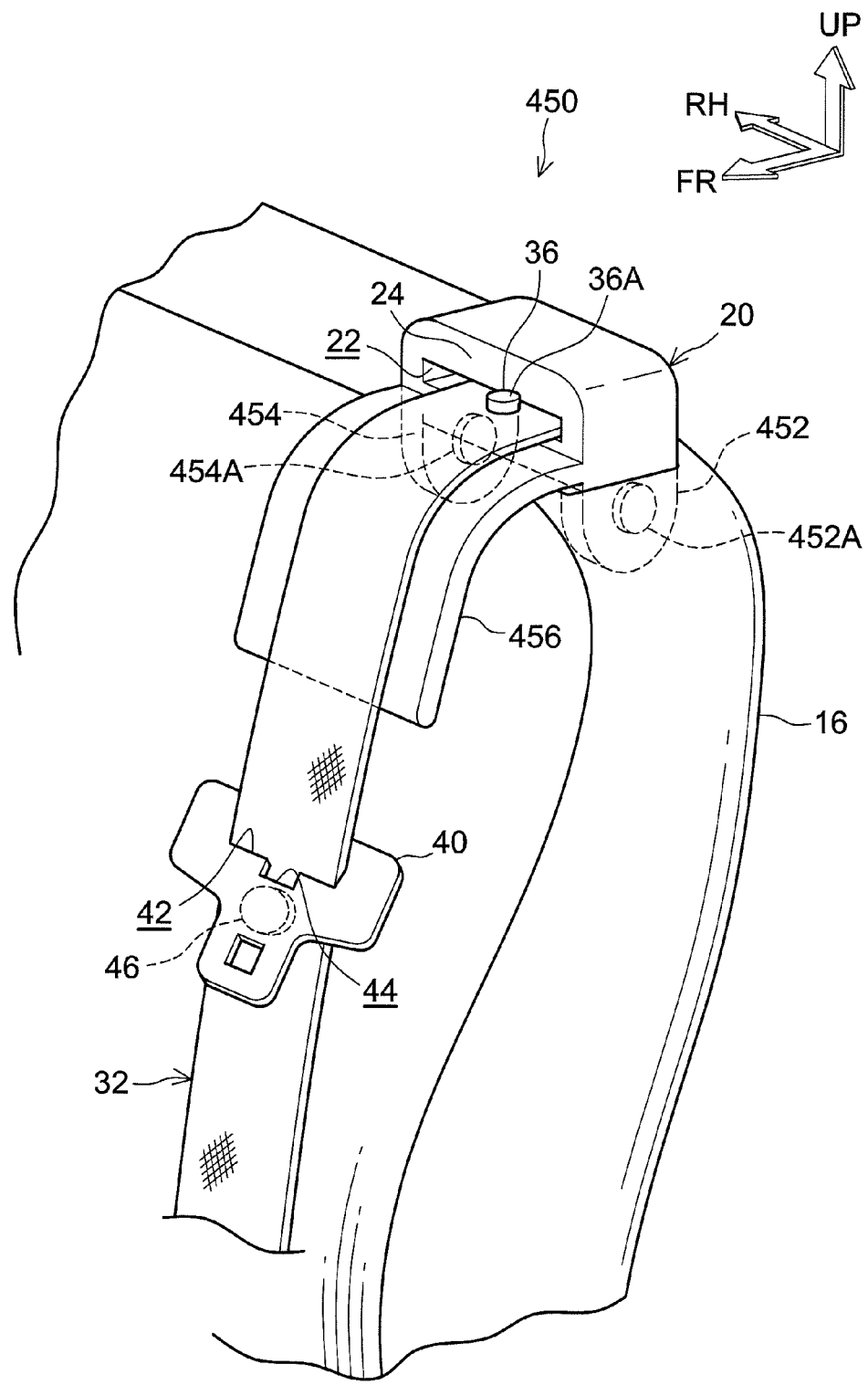
FIG. 12 is a perspective view of a webbing guide structure according to a ninth exemplary embodiment of the present invention, as viewed from the front left hand side of a vehicle.
Figure 13A:
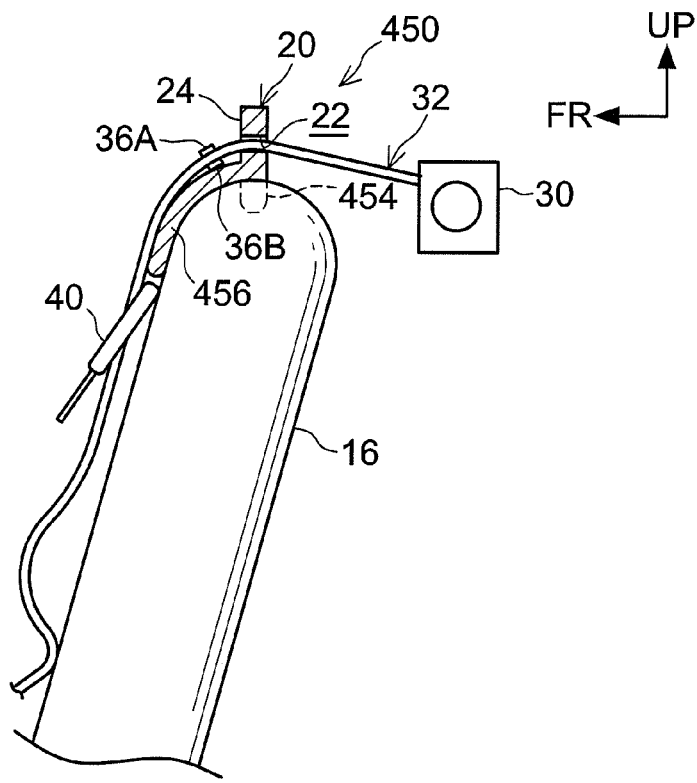
FIG. 13A and FIG. 13B are partially cut-away side views of relevant portions of a webbing guide structure according to a ninth exemplary embodiment of the present invention.
Figure 13B:
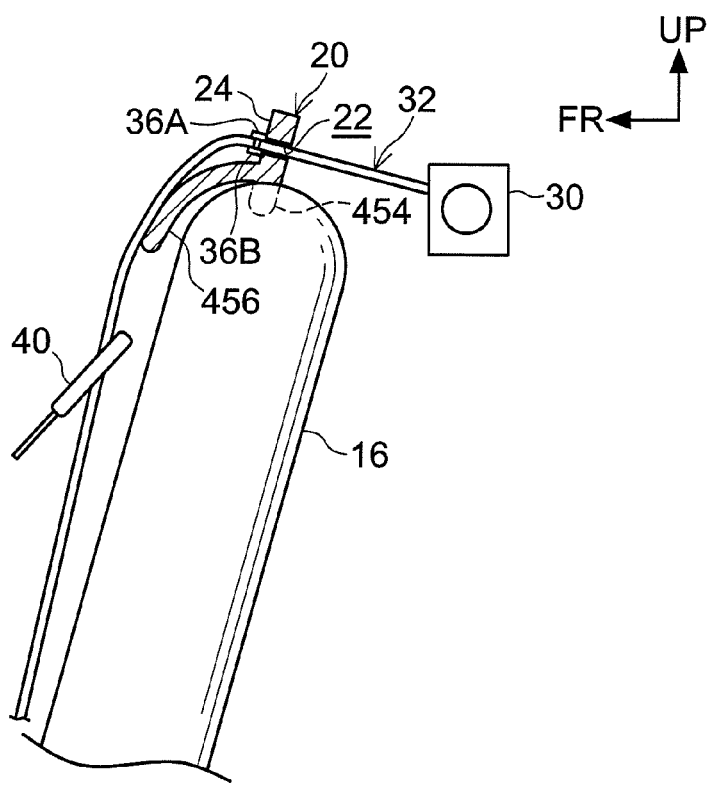

FIG. 12 is a perspective view of relevant portions of a webbing guide structure 450 according to a ninth exemplary embodiment of the present invention, as viewed from the front left hand side of a vehicle. FIG. 13A is a partially cut-away side view of the webbing guide structure 450 illustrating a state when the webbing 32 is being taken up, and FIG. 13B is a partially cut-away side view illustrating a state when the take-up stopper 36 has made contact with the contact face 24. In the drawings the vehicle front direction is indicated by arrow FR, the vehicle right hand side is indicated by arrow RH, and the up direction is indicated by arrow UP.

The ninth exemplary embodiment is similar in configuration to the first exemplary embodiment, but differs in the following points.

As shown in FIG. 12, in the ninth exemplary embodiment, the rigid portion 34 of the first exemplary embodiment is not provided to the webbing 32.

A plate shaped rotation support section 452 is provided at the bottom portion of the webbing guide 20 at a portion on the vehicle width direction outside of the webbing guide 20. A circular pillar shaped rotation support shaft 452A is provided to the vehicle width direction outside face of the rotation support section 452. The rotation support shaft 452A projects out from the rotation support section 452 to the vehicle width direction outside. A plate shaped rotation support section 454 is provided at the bottom portion of the webbing guide 20 at a portion on the vehicle width direction inside of the webbing guide 20. A circular pillar shaped rotation support shaft 454A is provided to the vehicle width direction inside face of the rotation support section 454. The rotation support shaft 454A projects out to the vehicle width direction inside from the rotation support section 454. The rotation support shaft 452A and the rotation support shaft 454A are disposed coaxially with respect to each other along the vehicle width direction. The rotation support shaft 452A and the rotation support shaft 454A are rotatably supported inside the rear seat back 16, and the webbing guide 20 is accordingly supported so as to be capable of rotation with respect to the rear seat back 16.

A rectangular plate shaped support section 456 is provided as a projecting portion at a lower side portion of the webbing guide 20 at a portion of the vehicle front-side of the webbing guide 20. The support section 456 projects out to the vehicle front-side from the contact face 24 of the webbing guide 20 and curves around at a length direction intermediate portion of the support section 456 so as to face downwards on progression towards the vehicle front-side.

As shown in FIG. 13A, the support section 456 of the webbing guide 20 is in contact with the rear seat back 16 up until the take-up stopper 36 contacts the contact face 24 of the webbing guide 20.

However, as shown in FIG. 13B, when the stopper portion 36A and the stopper portion 36B of the take-up stopper 36 has made contact with the contact face 24 of the webbing guide 20, the webbing guide 20 is rotated (moved) towards the vehicle rear-side by the take-up force acting on the webbing 32 arising from biasing force of the spiral spring of the webbing take-up device 30. The support section 456 is accordingly projected out with respect to the rear seat back 16 towards the vehicle front-side accompanying rotating of the webbing guide 20. The webbing 32 is accordingly raised by the support section 456. The webbing 32 is thereby separated from the rear seat back 16, providing the gap 38 between the webbing 32 and the rear seat back 16. The occupant P can hence easily grab the webbing 32.

According to the above configuration, due to utilizing the biasing force (take-up force) of the spiral spring of the webbing take-up device 30 to project the support section 456 out with respect to the rear seat back 16 towards the vehicle front, the need to provide a separate drive mechanism in order to project out the support section 456 can be eliminated. The gap 38 between the webbing 32 and the rear seat back 16 can accordingly be provided by employing a simple structure.

Furthermore, in the ninth exemplary embodiment, when the take-up stopper 36 has made contact with the contact face 24 of the webbing guide 20, due to the webbing guide 20 being rotated (moved) towards the vehicle rear-side with respect to the rear seat back 16 by the take-up force acting on the webbing 32 arising from the biasing force of the spiral spring, so the support section 456, with rotation of the webbing guide 20, is projected out from the rear seat back 16 to the vehicle front-side. The support section 456 can accordingly be caused to project out with respect to the rear seat back 16 towards the vehicle front-side by employing a simple structure.

Furthermore, the take-up stopper 36 of the webbing 32 can pass through inside the pass-through hole 44 of the tongue plate 40 when the webbing 32 is being fitted over the body of the occupant P. The length of the webbing 32 from the tongue plate 40 to the anchor can hence be set at a length corresponding to the frame of the occupant P.

Furthermore, due to the webbing guide 20 being rotated (moved) towards the vehicle rear-side by the take-up force acting on the webbing 32 arising from the biasing force of the spiral spring of the webbing take-up device 30, the support section 456, with rotating of the webbing guide 20, is projected out from the rear seat back 16 to the vehicle front-side. Accordingly, even if the occupant P is to knock against the support section 456 when the occupant P is getting into the vehicle, the webbing guide 20 readily rotates towards the vehicle front-side and the support section 456 can be moved. The occupant P can accordingly be protected.

Note that while in the first exemplary embodiment to the ninth exemplary embodiment, the webbing 32 extends from the above of the top end face of the rear seat back 16 toward the vehicle front-side with respect to the rear seat back 16, the extending position of the webbing 32 toward the vehicle front-side with respect to the rear seat back 16 is not limited. For example, configuration may be made with the webbing guide 20 provided at a lower side of the top end face of the rear seat back 16, with the webbing 32 extending from the guide hole 22 of the webbing guide 20 towards the vehicle front-side with respect to the rear seat back 16 from the upper side.

Appropriate combinations may be implemented of features selected from plural exemplary embodiments from the above first exemplary embodiment to the ninth exemplary embodiment.

What is claimed is:
1. A webbing guide structure comprising:
a take-up device that is capable of imparting take-up force to webbing that fits over an occupant seated on a seat of a vehicle and taking up the webbing;

a guide section that guides the webbing such that the webbing extends out from above a seat back of the seat toward a front side with respect to the seat back;

a restricting portion provided at the webbing, that is adapted to restrict movement of the webbing due to the take-up force by abutting to the guide section; and a projecting portion that separates the webbing from the seat back as a result of the projecting portion being projected out toward a seat front side with respect to the seat back due to the take-up force acting on the webbing when the restricting portion has abutted to the guide section, wherein, as a result of the restricting portion being moved with respect to the guide section due to the take-up force acting on the webbing when the restricting portion has abutted to the guide section, the projecting portion is projected out toward the seat front side with respect to the seat back together with movement of the restricting portion.

2. A webbing guide structure comprising:

a take-up device that is capable of imparting take-up force to webbing that fits over an occupant seated on a seat of a vehicle and taking up the webbing;

a guide section that guides the webbing such that the webbing extends out from above a seat back of the seat toward a front side with respect to the seat back;

a restricting portion provided at the webbing, that is adapted to restrict movement of the webbing due to the take-up force by abutting to the guide section; and a projecting portion that separates the webbing from the seat back as a result of the projecting portion being projected out toward a seat front side with respect to the seat back due to the take-up force acting on the webbing when the restricting portion has abutted to the guide section, wherein, as a result of the guide section being moved with respect to the seat back due to the take-up force acting on the webbing when the restricting portion has abutted to the guide section, the projecting portion is projected out toward the seat front side with respect to the seat back together with movement of the guide section.

3. A webbing guide structure comprising:

a take-up device that is capable of imparting take-up force to webbing that fits over an occupant seated on a seat of a vehicle and taking up the webbing;

a guide section that guides the webbing such that the webbing extends out from above a seat back of the seat toward a front side with respect to the seat back;

a restricting portion provided at the webbing, that is adapted to restrict movement of the webbing due to the take-up force by abutting to the guide section; and a projecting portion that separates the webbing from the seat back as a result of the projecting portion being projected out toward a seat front side with respect to the seat back due to the take-up force acting on the webbing when the restricting portion has abutted to the guide section, wherein when the restricting portion has abutted to the guide section, the webbing is moved towards an outer side in a seat left-right direction.

\* \* \* \* \*